United States Patent
Oz et al.

(10) Patent No.: US 6,434,141 B1
(45) Date of Patent: Aug. 13, 2002

(54) COMMUNICATION MANAGEMENT SYSTEM AND METHOD

(75) Inventors: Ran M. Oz, Modlin; Nery Strassman, Ramat Gan, both of (IL); Amir Basan-eskenazi, San Mateo, CA (US); Andrey Yruski, Natanya; Oded Golan, Tel Aviv, both of (IL)

(73) Assignee: Bigband Networks, Inc., Fremont, CA (US)

(*) Notice: Subject to any disclaimer, the term of this patent is extended or adjusted under 35 U.S.C. 154(b) by 0 days.

(21) Appl. No.: 09/579,551

(22) Filed: May 26, 2000

Related U.S. Application Data

(60) Provisional application No. 60/136,006, filed on May 26, 1999, provisional application No. 60/139,649, filed on Jun. 17, 1999, provisional application No. 60/153,347, filed on Sep. 10, 1999, provisional application No. 60/188,489, filed on Mar. 10, 2000, and provisional application No. 60/188,486, filed on Mar. 10, 2000.

(51) Int. Cl.[7] ............................................. H04L 12/66
(52) U.S. Cl. ..................................... 370/352; 370/422
(58) Field of Search ............................. 370/422, 427, 370/426, 419, 420, 535, 486, 468, 538, 539, 540, 352, 353, 355, 356, 487; 709/227, 228

(56) References Cited

U.S. PATENT DOCUMENTS

| | | | | |
|---|---|---|---|---|
| 4,829,372 A | * | 5/1989 | McCalley et al. | 358/86 |
| 5,115,427 A | | 5/1992 | Johnson, Jr. et al. | |
| 5,541,917 A | * | 7/1996 | Farris | 370/352 |
| 5,561,669 A | | 10/1996 | Lenney et al. | 370/60.1 |
| 5,666,487 A | | 9/1997 | Goodman et al. | |
| 5,719,862 A | | 2/1998 | Lee et al. | 370/355 |
| 5,742,761 A | | 4/1998 | Olnowich et al. | 395/200.2 |
| 5,748,626 A | | 5/1998 | Esaki et al. | 370/355 |
| 5,781,726 A | | 7/1998 | Pereira | 395/200.3 |
| 5,940,598 A | * | 8/1999 | Strauss et al. | |

FOREIGN PATENT DOCUMENTS

| | | |
|---|---|---|
| WO | WO 97/36404 | 10/1997 |
| WO | WO 98/10541 | 3/1998 |
| WO | WO 99/09689 | 2/1999 |

OTHER PUBLICATIONS

International Search Report–PCT/US00/14544, Oct. 26, 2001.

Dail J E et al: "Adaptive Digital Access Protocol: A Mac Protocol for Multiservice Broadband Access Networks" IEEE Communications Magazine, IEEE Service Center. Piscataway, N.J, US, vol. 34, No. 3, Mar. 1, 1996, pp. 104–112, XP000557382.

Oliphant A et al: "Broadband CPN Demonstrator Using Wavelength and Time Division Multiplexing" Electronics and Communication Engineering Journal, Institution of Electrical Engineers, London, GB, vol. 4, No. 4, Aug. 1, 1992, pp. 252–260, XP000309442.

Perkins, S. et al., "Two–Way Broadband CATV–HFC Networks: State–of–the–Art and Future Trends", *Computer Networks and ISDN Systems*, North Holland Publishing, Asterdam, NL., vol. 31, No. 4 (Feb. 25, 1999) pp. 313–326.

John T. Chapman, "Multmedia Traffic Engineering for HFC Networks," Cisco Systems (Nov. 29, 1999).

\* cited by examiner

*Primary Examiner*—David Vincent
*Assistant Examiner*—Alexander O. Boakye
(74) *Attorney, Agent, or Firm*—Blakely Sokoloff Taylor & Zafman LLP

(57) ABSTRACT

Broadband multimedia system including a communication bus, a router, connected to the communication bus and further between a plurality of media sources and a plurality of network transmitters, a session manager, connected to communication bus, where the session manager provides routing instructions to the router, for directing data received from the media sources to the network transmitters for transmitting over a broadband network.

32 Claims, 11 Drawing Sheets

FIG. 10A DCT Coefficients

COMMUNICATION MANAGEMENT SYSTEM AND METHOD

CROSS REFERENCE TO RELATED CASES

This claims priority to and the benefit of each of the following U.S. Provisional Applications; serial number 60/136,006, filed May 26, 1999; Ser. No. 60/139,649, filed Jun. 17, 1999; Ser. No. 60/153,347, filed Sep. 10, 1999; Ser. No. 60/188,489 filed Mar. 10, 2000; and Ser. No. 60/188,486 filed Mar. 10, 2000.

FIELD OF THE INVENTION

The present invention relates to communication systems in general, and to methods and systems for managing broadband multimedia communication, in particular.

BACKGROUND OF THE INVENTION

Broadband communication systems are known in the art. The main types include video oriented communication systems and data oriented communication systems. Video oriented communication systems were originally designed for television broadcast transmissions and today include modifications, which enable narrow-cast transmissions as well as data communications there through. Data oriented communication systems are used for a plurality of data and multimedia applications. Conventionally, downstream channels (from the cable service operator to the end user) are used to carry either only IP packets (using DOCSIS for example) or only native MPEG programs over MPEG transport. This requires the cable operator to perform fixed allocation of downstream resources for different services, which limits the resource usage efficiency, especially for the downstream bandwidth.

Cable Modem Termination Systems (CMTS) are known in the art. Such systems are installed in a cable head-end and are connected to a plurality (conventionally thousands) of Cable Modems (CM) via a Hybrid Fiber/Coaxial (HFC) Network. A conventional single CMTS board transmits downstream information on a single channel and receives upstream information from one or more (usually not more than 8) upstream channels. Upstream channels which are connected to a single CMTS board, can be received from many nodes (usually for areas which are characterized by a small number of cable modem users) or from a single node (usually for areas which are characterized by a large number of cable modem users).

The operation of a conventional CMTS is generally predefined, where the cable modem users are configured to utilize a specific CMTS downstream channel. Each CMTS downstream channel has specific associated upstream channels. The CMTS board uses its associated downstream channel, to provide upstream channels and time slot information to the CMs on which they can transmit information back to the head-end, at any given time.

An article, "Multimedia Traffic Engineering for HFC Networks" by John T. Chapman from Cisco Systems (Nov. 29, 1999), discusses possible CMTS architectures contingent on penetration of CMs and broadband services.

Using prior art systems, DOCSIS upstream channels are rigidly coupled to their associated downstream channel. In high penetration areas serving high bandwidth applications, there is a need to provide several downstream channels per each given node. Accordingly, the entire group of cable modem subscribers in that node has to be divided into smaller groups, where each group is assigned and served by a separate downstream channel, and some upstream channels that are associated therewith. It will be appreciated by those skilled in the art that this architecture utilizes upstream bandwidth inefficiently, since upstream resources are fixed allocated to each group rather than dynamically allocated between the groups, which are associated with the same node. In addition, there is a major reliability/redundancy hazard in a case where only one upstream channel is allocated to each DOCSIS MAC domain (i.e. for each downstream channel).

Digital video and other media are typically transmitted in a compressed form, encapsulated in MPEG transport packets, which include information associating them to a specific stream. It is noted that MPEG transport packets do not include neither source address information nor destination address information and hence can not be switched, using networking methods and systems, which are known in the art.

U.S. Pat. No. 5,719,862 to Lee, et al., and entitled "Packet-Based Dynamic De-Skewing for Network Switch with Local or Central Clock", is directed to a network switch with packet-based de-skewing. A switch core switches between a plurality of source media-access controllers (MAC's) and a plurality of destination MAC's. Each source MAC is provided with a framer, and each destination MAC is provided with a de-skew circuit. A clock source provides input to each framer and each de-skew circuit. Each link is provided with a single serial data line through the switch core. The framer receives a serial data packet from the source MAC, and adds a start flag sequence (header) to the packet. As communication links are broken and new links are established, the new links introduce a different amount of skew. The de-skew circuit measures the clock skew of the packet received through the new link, by comparing the phases of the received start flag sequence, and a known start flag sequence.

U.S. Pat. No. 5,742,761 to Olnowich, et al., entitled "Apparatus for Adapting Message Protocols for a Switch Network and a Bus", is directed to a system for inter-linking a plurality of computers connected to a switch network. Each computer is connected to a Micro-Channel (MC) converter unit via a MC bus, and each MC converter is connected to the input and output port of the switch network. Each of the computer resources such as processor, memory, and I/O units is connected to a slot on the MC bus. The MC converter converts the address of a resource on a remote computer, as requested by a client, to a means for locating the exact MC island. The switch network establishes the link between the client and the remote computer. The client transfers data to the MC converter of the remote computer, and this MC converter transfers the data to the designated slot on the MC bus of the remote computer. Then, the designated resource of the remote computer receives the data.

U.S. Pat. No. 5,781,726 to Preira, entitled "Management of Polling Traffic in Connection Oriented Sessions", is directed to a system for connecting an end station in a first local area network (LAN), to an end station in a second (LAN). The first LAN is connected to a central node (CN), and the second LAN is connected to a leaf node (LN). The CN and the LN are interconnected by an intermediate session link. An end station in the first LAN establishes connection with an end station in the second LAN, by a first link session, the intermediate session link, and a second link session. The first link session connects the end station in the first LAN to the CN, and the second link session connects the LN to an end station in the second LAN.

U.S. Pat. No. 5,748,626 to Esaki, et al., entitled "ATM Communication System With High Speed Connection-Less Service Function", is directed to a system for transferring ATM cells between a plurality of ATM networks, equipped with connection-less service function. The ATM networks are interconnected by an inter-networking unit (IWU). The IWU unit includes an ATM switch of N inputs and M outputs, a call processing unit and an IWU management unit connected to the ATM switch. The IWU unit further includes N input processing units for entering inputs from N ATM networks, and M output processing units for outputting outputs to M ATM networks. The call processing unit sets up, cuts off, changes, and manages the ATM connection over the IWU. The IWU management unit manages and controls the IWU.

Each of the input processing units analyzes the header value of the entering ATM cell, converts the header value if necessary, and attaches a routing tag for appropriate routing of the ATM cell. Each of the output processing units removes the routing tag from the cell, and converts the header value if necessary. The ATM switch switches the outputs of the N input processing units, the call processing unit, and the IWU management unit, into the inputs of the M output processing units, the call processing unit, and the IWU management unit.

SUMMARY OF THE PRESENT INVENTION

It is an object of the present invention to provide a novel method and system for managing a broadband network, which overcomes the disadvantages of the prior art.

In accordance with the present invention, there is thus provided a system for switching packets. The system includes a plurality of input ports, a plurality of non-addressable stream output ports, and a multiple port switch. The input ports include at least one non-addressable stream input port. The multiple port switch is connected between the non-addressable stream input ports, and the non-addressable stream output ports.

The multiple port switch directs a packet which it receives from a non-addressable stream input port, to a non-addressable stream output port. The multiple port switch selects the non-addressable stream output port, according to the type and identity of the non-addressable stream input port, and the program identification information embedded in the received packet.

The system can further include a priority controller, connected to the multiple port switch, and at least one media degradation unit, wherein each of the media degradation units is coupled to each of the non-addressable stream output ports. It is noted, that the non-addressable stream input port is operative to receive MPEG transport packets.

The system can further include at least one addressable stream communication port, connected to the multiple port switch. The multiple port switch directs a packet, which it receives from an addressable stream communication port, to the non-addressable stream output port. It is noted, that the addressable stream input port can be operative to receive Ethernet packets or IP packets. The non-addressable stream output port encapsulates the packet in a non-addressable stream packet, when the packet is received from one of the addressable stream input ports.

The MPEG transport packets are encapsulated into communication packets respective of the communication protocol of the multiple port switch. The non-addressable stream input port includes an interface that carries multi program transport streams (such as DVB/ASI and DHEI), wherein each of the non-addressable stream output ports includes an interface that carries multi program transport streams (such as DVB/ASI and DHEI). Furthermore, each of the addressable stream input ports includes a data input port (e.g., fast Ethernet, Giga-bit Ethernet, ATM and the like).

The system can further include a plurality of stream processors, wherein each stream processor is connected between the multiple port switch, and a respective non-addressable stream output port. Each stream processor can perform a variety of procedures such as multiplexing, re-multiplexing, rate adaptation, PID re-mapping, PCR re-stamping, updating system information embedded in transport streams, and the like.

In accordance with another aspect of the present invention, there is thus provided a method for switching packets. The method includes the steps of receiving a packet from an input port, selecting a non-addressable stream output port, and directing the packet to the non-addressable stream output port. The non-addressable stream output port is selected according to the type and identity of the input port, and the program identification information embedded in the received packet. It is noted, that the input port can be a non-addressable stream output port, an addressable stream input port, and the like.

The method can further include the step of prioritizing the directing of the session associated with the received packet, and encapsulating the packet in a non-addressable stream packet, when the packet is received from an addressable stream input port. The method further includes the step of encapsulating the packet in an addressable stream packet, when the packet is received from a non-addressable stream input port. The non-addressable stream packet can include an MPEG transport packet, and the addressable stream packet can include a data packet.

The method can further include the step of stream processing the packet, wherein the step of stream processing includes procedures such as multiplexing, re-multiplexing, rate adaptation, PID re-mapping, PCR re-stamping, updating system information embedded in transport streams, and the like.

In accordance with a further aspect of the present invention, there is thus provided a method for switching packets. The method includes an initial step of receiving a packet from an input port. When the packet is received from the non-addressable stream input port, the method includes the steps of detecting identity information associated with the received packet, determining at least one destination port according to the identity information, and embedding the packet in an addressable stream packet, with a header directed to the destination port. The method further includes the step of directing the data packet to the destination port. It is noted, that the input port can be a non-addressable stream input port, an addressable stream input port, and the like. Prior to the step of directing, the method can further include the step of determining the received packet, wherein a data packet has at least one destination port when the packet is received from an addressable stream input port.

The identity information can include the identity of a non-addressable stream port which receives the packet, the identity of a media stream associated with the packet, the identity of a media stream associated with the packet, and the like. The method can further include the step of stream processing the packet, which includes a variety of procedures such as, multiplexing, re-multiplexing, rate adaptation, PID re-mapping, PCR re-stamping, updating system information embedded in transport streams, and the like. It is noted, that the non-addressable stream packet can include an MPEG transport packet, and the addressable stream packet can include a data packet.

In accordance with another aspect of the present invention, there is thus provided a broadband multimedia system. The broadband multimedia system includes a communication bus, a router, and a session manager. The router is connected to the communication bus, and further between a plurality of media sources, and a plurality of network transmitters. The session manager is connected to the communication bus. The session manager provides routing instructions to the router, for directing data received from the media sources to the network transmitters, for transmitting over a broadband network.

The broadband multimedia system can further include a policy database, connected to the communication bus, wherein the session manager produces the routing instructions, according to policy information retrieved from the policy database. The policy database can include general policy rules, network policy rules, and the like. The broadband multimedia system can further include a bandwidth utilization detection unit, connected to the communication bus, wherein the session manager produces the routing instructions according to bandwidth utilization information, received from the bandwidth utilization detection unit.

The broadband multimedia system can further include a network management system, connected to the communication bus, wherein the session manager produces the routing instructions according to bandwidth network management information, received from the network management system. The broadband multimedia system can further include a dynamic network restructuring unit, connected to the communication bus. The network transmitters are further connected to the communication bus, and the dynamic network restructuring unit provides channel managing commands to each of the network transmitters, receiving data from the router.

The session manager receives a plurality of session requests, for executing a session through the broadband multimedia system. The session manager either allows or denies each session request. The session manager further provides resource allocation parameters for each of the allowed sessions. The broadband multimedia system can further include an RF switch, connected to the communication bus, and between the network transmitters and a plurality of RF combiners. The RF switch directs RF signals from the network transmitters to the RF combiners.

The broadband multimedia system can further include a dynamic network restructuring system, connected to the communication bus. The dynamic network restructuring system provides switching commands to the RF switch for directing the RF signals. The network transmitters can be QAM units. The broadband network can be an HFC network, a DSL network, a satellite network, a wired network, a wireless network, and the like.

In accordance with a further aspect of the present invention, there is thus provided a network session management system. The network session management system includes a session manager, coupled to at least one application manager, and at least one policy database. The session manager receives session requests, and denies the session request when it detects non-compliance of the session request, with the policy rule retrieved from the policy database.

The network session management system can further include a shared area manager, coupled to the session manager. The shared area manager produces a session denial indication, when it detects non-compliance of the session request with predetermined shared area policy rules. The network session management system can further include a dynamic network restructuring unit, coupled to the shared area manager. The dynamic-network-restructuring unit produces a session denial indication, when it detects non-compliance of the bandwidth required in the session request and available network bandwidth.

The network restructuring unit determines network resources to session request session denial indication, when it detects compliance of the bandwidth required in the session request, and available network bandwidth. The session manager authorizes the session request when it detects compliance with the policy rules retrieved from the policy database, and when it receives a session approval indication from the shared area manager. The session manager further assigns the determined network resources to the session request, and available network bandwidth.

The session manager is further coupled to an out of band manager, wherein the session manager receives at least one of the session requests from the out of band manager. The policy database can be a general policy database, a network policy database, a sub-network policy database, a target policy database, an external application policy database, and the like. The session manager is further coupled to additional information resources. The session manager denies the session requests when it detects non-compliance of the session request with a parameter retrieved from the additional information resources.

In accordance with another aspect of the present invention, there is thus provided a method for managing sessions. The method includes the steps of denying an init-session request, when detecting non-compliance of the init-session request with at least one general policy rule, and authorizing the init-session request when the init-session request is not denied. The method further includes the step of denying the init-session request, when detecting non-compliance of the init-session request with at least one network policy rule. The method can further include the step of authorizing the init-session request when the init-session request is not denied, and denying the init-session request when detecting non-compliance of the init-session request with at least one bandwidth usage policy rule. The method can further include the step of authorizing the init-session request when the init-session request is not denied, and denying the init-session request when detecting non-compliance of the init-session request with available channels and bandwidth (e.g., when the requested resources are greater than the available resources).

The method can further include the steps of denying the init-session request when detecting non-compliance of the init-session request with available channels and bandwidth, and authorizing the init-session request when the init-session request is not denied. The method can further include the steps of assigning at least one channel and bandwidth within the channel, to the init-session request when the init-session request is not denied, and launching a session associated with the init-session request.

The step of launching can include the sub procedures of operating an input module receiving the session, according to approved session information, and operating a switching module switching the session, according to approved session information. The step of launching can further include the sub procedure of operating at least one output module through which the session is to be directed, according to approved session information.

In accordance with another aspect of the present invention, there is thus provided a method for managing sessions at a shared area level. The method includes the step of denying an init-session request, when detecting non-compliance of the init-session request with at least one shared area session policy rule. The method can further include the step of determining if the bandwidth requirement of the session associated with the init session request, is no greater than the available bandwidth within channels of the shared area. The method can further include the step of detecting an additional channel to be assigned to the shared area, when the bandwidth requirement are greater than the available bandwidth within the channels of the shared area. The method can further include the step of denying an init-session request, when the additional channel can not be detected, or when the additional channel can not be added to the shared area.

The method can further include the steps of assigning an optimal channel to the shared area, from channels of the shared area network, and providing session parameters to a channel manager operating the assigned channel. The method can further include the steps of detecting a channel readiness information provided by the channel manager, denying the session when the channel readiness information includes a channel non-readiness indication, and approving the session when the channel readiness information includes a channel readiness indication.

In accordance with another aspect of the present invention, there is thus provided a method for dynamic network restructuring. The method includes the steps of denying an init-session request, when the bandwidth requirement of a session associated with the init-session request, is greater than the available bandwidth within the shared area, and denying the init-session request, when the channel equipment requirement of the session, is unavailable within the shared area.

The method can further include the steps of allocating channel and bandwidth for the session, and denying the init-session request when the RF equipment requirement of the session, is unavailable RF equipment within the shared area. The method can further include the step of determining an RF route for the session. This step can be performed by hardware switching.

In accordance with a further aspect of the present invention, there is thus provided a packet switch system. The packet switch system includes a packet switch engine, a downstream re-multiplexing engine, and a plurality of media-access controllers. The downstream re-multiplexing engine is coupled to the packet switch engine, and to a plurality of downstream transmit units. The media-access controllers are coupled to the downstream re-multiplexing engine, to the packet switch engine, and to upstream channels. The media-access controllers provide packets received from the upstream channels, either to the downstream re-multiplexing engine, or to the packet switch engine, according to packet content type and packet original destination.

The packet switch system can further include an upstream switch coupled between the media-access controllers and the upstream channels. The upstream switch dynamically directs packets from upstream channels to the media-access controllers. The packet switch engine is further coupled to a data network. The data network can be an IP network. The downstream transmit units are further coupled to a broadband network, including in-band channels and out-of-band channels. The packet switch engine is further coupled to the out-of-band channels, via a data link. The out-of-band channels can be determined out-of-band channels, and the data link comprises an IP interface.

The packet switch system can further include a rate adaptation statistical multiplexor engine, coupled to the packet switch engine, and a processor coupled to the packet switch engine. The packet switch system can further include a processor, coupled to the packet switch engine, and a processor, coupled to the packet switch engine.

The processor can determine and control the load balancing between competing communication elements, and it can provide parameters there according, to the downstream re-multiplexing engine, the rate adaptation statistical multiplexor engine, and the media-access controllers. The processor can further determine transmit priority to each session, transmitted through the downstream re-multiplexing engine, detect over all transmit load, and control the transmitting order and quality of the sessions.

In accordance with a further aspect of the present invention, there is thus provided a method for directing a packet in a communication switching system. The method includes the step of rate adapted multiplexing the packet, over data-over-broadband (e.g., DOCSIS) network transmission, when the packet is a part of a media session over data-over-broadband network transmission, authorized for rate adaptation multiplexing. The method can further include the step of rate adapted multiplexing the packet, over media-over-broadband (e.g., MPEG transport) network transmission, when the packet is a part of a media session over media-over-broadband network transmission, authorized for rate adaptation multiplexing.

The method can further include the step of multiplexing the packet, over media-over-broadband network transmission, when the packet is a part of a media session over media-over-broadband network transmission, not authorized for rate adaptation. The method can further include the step of encapsulating the packet and re-multiplexing the encapsulated packet for further transmission, when the packet is directed to a non-DOCSIS network transmission end unit, supporting in-band channels. The method can further include the step of directing the packet to an out-of-band channel, when the packet is directed to a non DOCSIS network transmission end unit, not supporting in-band channels.

The method can further include the step of directing the packet to a selected media-access controller, and further re-multiplexing the packet for further transmission, when the packet is directed to a cable modem. The method can further include the steps of determining a packet destination according to session management determination, or external network resources, directing the packet to the packet destination when the packet destination is determined, and discarding the packet when the packet destination can not be determined. The method can further include the steps of assigning priority to each session, associated with a received packet, detecting transmit system load, and controlling the session transmit order and quality according to the detected transmit system load.

The method can further include the steps of assigning priority to each session associated with a received packet, detecting transmit system load, and controlling the session transmit order and quality according to the detected transmit system load. The media-over-broadband network transmission can include MPEG transport, data-over-cable (DOCSIS) transmission, and the like.

BRIEF DESCRIPTION OF THE DRAWINGS

The present invention will be understood and appreciated more fully from the following detailed description taken in conjunction with the drawings in which:

FIG. 10A, which is a visual representation of block DCT values, at a predetermined quantizing value, after basic quantizing;

DETAILED DESCRIPTION OF PREFERRED EMBODIMENTS

The present invention overcomes the disadvantages of the prior art by providing a system and a method, which unifies different media sources over selected media transport channels, in a manner which is seamless to the end user, and in most cases even to the media provider.

The disclosed technique is directed to broadband network, which can be either wired or wireless, such as an HFC network, a DSL network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB/ASI and DHEI are examples for digital video (MPEG) transmission specifications. The disclosed technique provides examples, which include DVB/ASI modules. It is noted that these DVB/ASI modules, can be replaced by equivalent modules, such as DHEI modules, and the like.

DOCSIS is a data over cable transmission specification. CMTS denotes cable modem termination system, which is conventionally used for DOCSIS. MPEG denotes a family of media (especially video and audio) decoding and multiplexing specifications where ISO/IEC 11172 is also called MPEG-1 and the ISO/IEC 13818 is also called MPEG-2.

Figure 1:
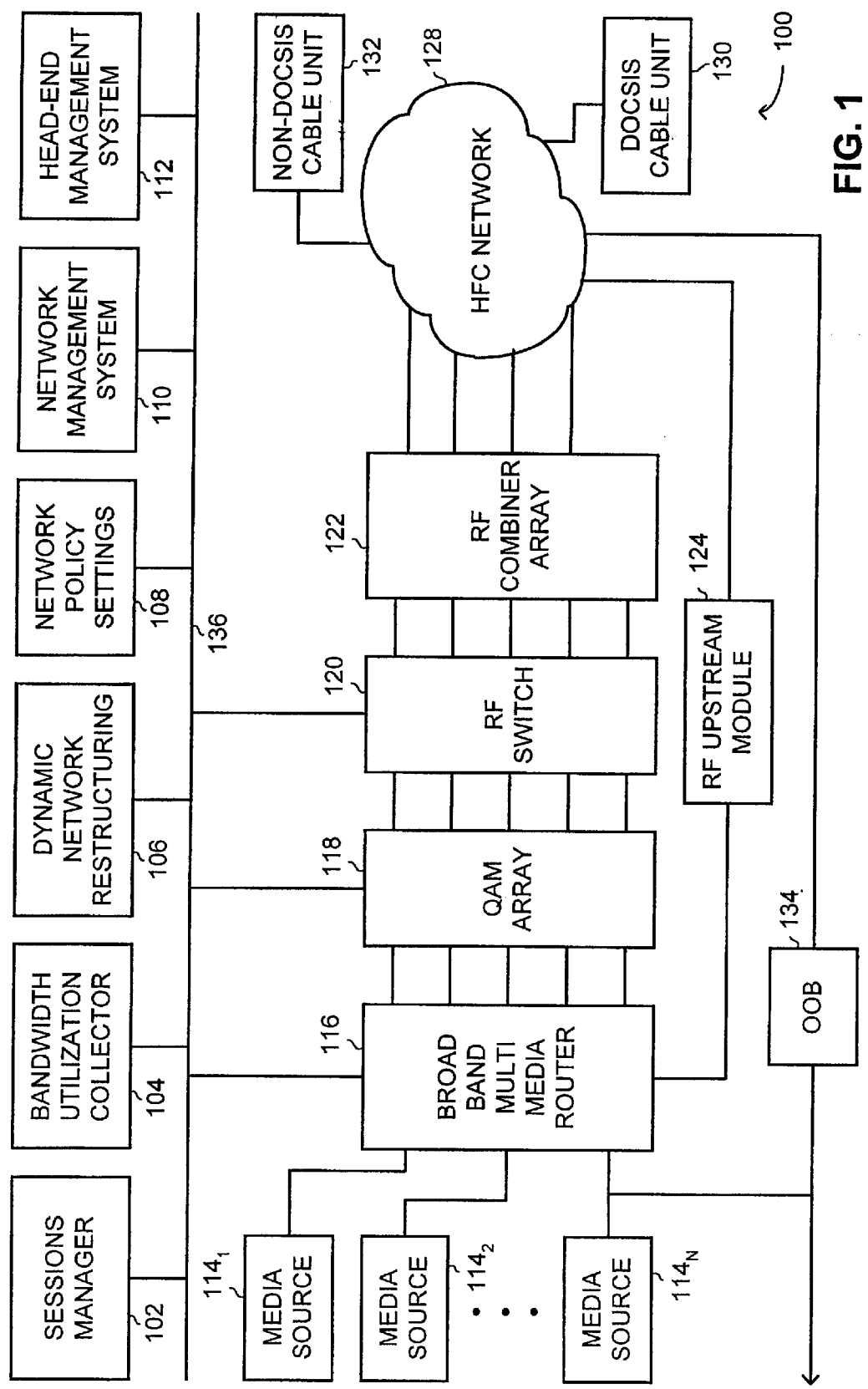
FIG. 1 is a schematic illustration of a Broadband Multimedia system, constructed and operative in accordance with a preferred embodiment of the present invention.

Reference is now made to FIG. 1, which is a schematic illustration of a Broadband Multimedia system, generally referenced 100, constructed and operative in accordance with a preferred embodiment of the present invention. System 100 includes a logical communication bus 136, a session manager unit 102, a bandwidth utilization collector 104, a dynamic network restructuring unit 106, a network policy settings unit 108, a network management system 110, and a head-end management system 112. System 100 further includes a plurality of media sources $114_1, 114_2$ and $114_n$, a broadband multimedia routes 116, a QAM array 118, an RF switch 120, an RF upstream module 124, an RF combiner array 122, an HFC network 128, a DOCSIS cable unit 130, a non-DOCSIS cable unit 132, and an Out-Of-Band unit 134.

Session manager unit 102, bandwidth utilization collector 104, dynamic network restructuring unit 106, network policy settings unit 108, network management system 110, and head-end management system are connected to the logical communication bus 136. Broadband multimedia router 116 is connected to media sources $114_1$, $114_2$. and $114_n$, to logical communication bus 136, RF upstream module 124 and to QAM array 118. RF switch 120 is connected to logical communication bus 136, QAM array 118 and to RF combiner array 122. RF upstream module 124 is connected to broadband multimedia router 116, to non-DOCSIS cable unit 132, and to DOCSIS cable unit 130 via HFC network 128. RF combiner array 122 is further connected to non-DOCSIS cable unit 132, Out-Of-Band unit 134 and to DOCSIS cable unit 130 via HFC network 128.

Session manager unit 102 receives and approves session requests, processes them and provides routing parameters to the broadband multimedia router 116. Broadband multimedia router 116 receives media streams from media source application $114_1$–$114_n$. It is noted that such media streams can include video streams, audio streams, data streams, individual data packets and the like. Such streams can be received over video channels, such as ones operative according to MPEG transport interfaces, or over data channels, such as TCP/IP Ethernet communication lines.

The routing parameters produced by session manager 102, specify input and output routing commands for broadband multimedia router 116, to operate there according. It is noted that a conventional MPEG transport stream does not include routing information such as destination or origin, rather just limited identification information, known as PID (Packet Identification) The disclosed technique overcomes this disadvantage as will be described in detail in conjunction with FIG. 6. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. The session manager 102 receives session initialization requests from a variety of media sources, such as application servers, end users, and additional modules. The session manager 102, determines if these requests are compatible with each of a plurality of policy types and available resources, and determines whether or not to approve or deny these requests.

The session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end users, at predetermined hours of the day. A further example for a network policy can include a condition where a selected source can only provide services to selected users, and not to others, and the like. The session manager further accesses network management system 110, for determining if there are malfunctions in selected parts of the network.

Broadband multimedia router 116 is connected to plurality of media sources $114_1$–$114_n$. Broadband multimedia router 116 directs data from these media sources to the appropriate output ports. QAM array 118 includes a plurality of QAM units (not shown), each receiving DVB/ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The RF switch 120 is operative to route RF channels from each port therein, to each other port therein. Hence, RF switch 120 can connect each QAM of QAM array 118 to each RF combiner of RF combiner array 122, and thus, dynamically control network RF resources.

Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to HFC network 128. End user equipment, such as non-DOCSIS cable unit 132 and DOCSIS cable unit 130, is connected to the system via HFC network 128, and is thus able to receive these transmissions. This direction is called downstream. Non-DOCSIS cable unit 132 can include a simple set-top box, television set, and the like. DOCSIS cable unit 130 is a unit, which supports DOCSIS specification and can be a DOCSIS ready set-top box, a computer, a cable modem and the like.

According to the present invention, end user equipment is also capable of transmitting data. This direction is called upstream. RF upstream module 124 receives signals from the end user equipment, and performs down-conversion and demodulation thereof. RF upstream module 124 can further include an RF switching mechanism, which optimizes the usage of the upstream direction, and hence can further enhance the operation of system 100. The Out-Of-Band (OOB) module 134 communicates with each of the targets of that upstream information in the Head-end, thus providing a reverse channel from HFC network 128 to Head-end.

Figure 2A:
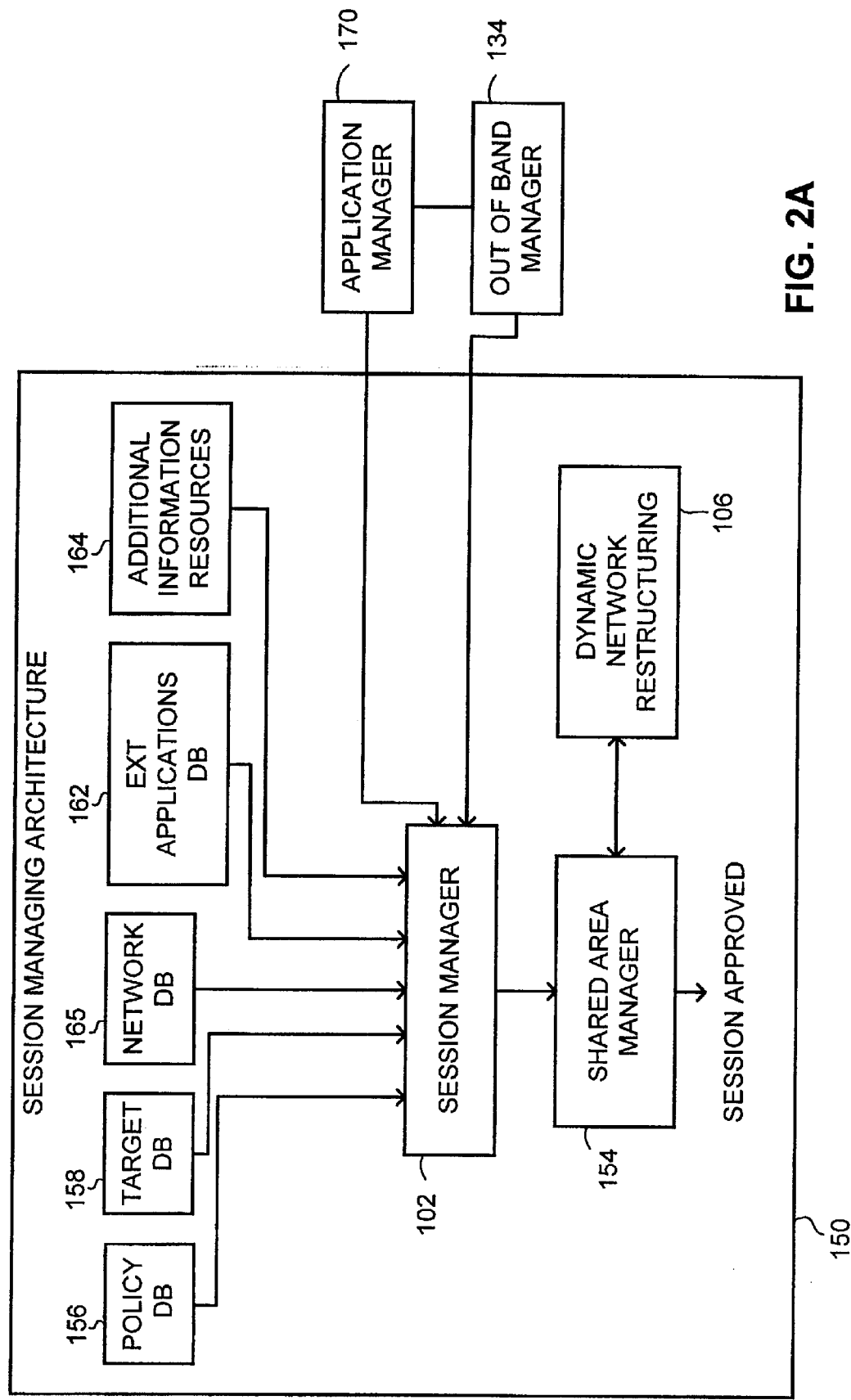
FIG. 2A is a schematic illustration of in detail of a session managing architecture, constructed and operative in accordance with another preferred embodiment of the present invention.

Reference is now made to FIG. 2A, which is a schematic illustration in detail of a session managing architecture, generally referenced 150, constructed and operative in accordance with another preferred embodiment of the present invention. Session managing architecture 150 is described in conjunction with system 100 of FIG. 1.

Architecture 150 includes session manager 102 (FIG. 1), a shared area manager 154, a policy database 156, a target database 158, a network database 160, an external applications database 162, and an additional information resources 164. Architecture 150 further includes a Dynamic Network Restructuring Manager (DNR) 106 (FIG. 1), an application manager 170, and an Out-Of-Band manager 134 (FIG. 1).

Policy database 156 is a general policy database which includes a plurality of policy records specifying rules, such as what kind of information can be transmitted in the system, from which sources, to which targets, at what time, and the like. Target database 158 includes a plurality of target records. A target record can include information related to policies related to the target, network topological location of the target, and the like.

Network database 160 includes a plurality of network policy records. A network policy can include restrictions regarding overall usage of the network, such as a predetermined minimal transmission quality level for selected portions of the network, scheduling schemes for allocating selected portions of the network for specific services, and the like.

External applications database 162 includes a plurality of external application records specifying data on these applications, such as what is allowed or forbidden for these applications, and how are these applications connected to the system.

Shared area manager 154 manages the bandwidth utilization for one group of nodes, where a node is further directly connected to a plurality of end users using end point equipment, which can include DOCSIS cable units, non-DOCSIS cable units, digital television sets, and the like. It assigns the optimal channel to the session. All of these nodes are connected to the same cable network, and hence are operative to receive transmissions over the same cables, supporting broadcast, multicast and unicast.

Session manager 102 is connected to shared area manager 154, policy database 156, target database 158, network database 160, external applications database 162, additional information resources 164, application manager 170, and Out-Of-Band manager 134. Application manager 170 is further connected to Out-Of-Band manager 134. Shared area manager 154 is further connected to DNR manager 106.

As stated above, session manager 102 is operative to approve or deny session initialization requests to the system 100 (FIG. 1). Session manager 102 receives an init-session request either from the application manager 170, or from the Out-Of-Band manager 134.

Figure 2B:
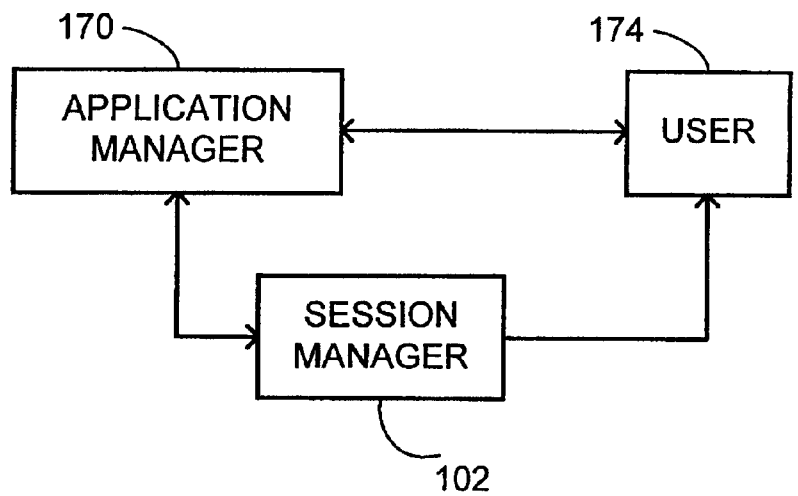
FIG. 2B is a schematic illustration of a session request example, in accordance with a further preferred embodiment of the present invention.
Figure 2C:
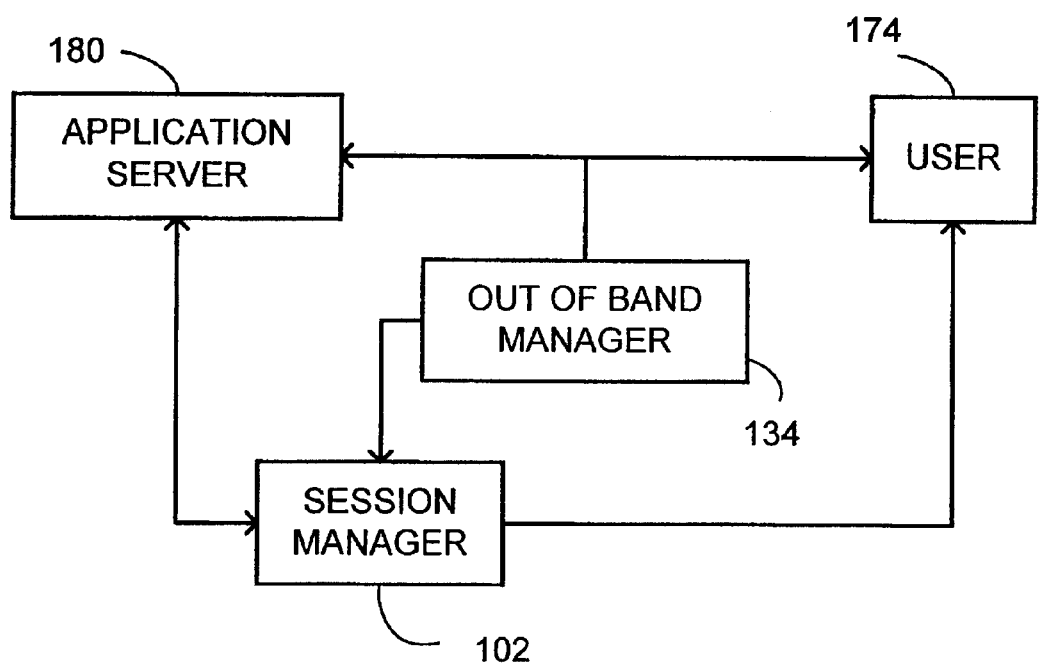
FIG. 2C is a schematic illustration of a session request example, in accordance with another preferred embodiment of the present invention.

Reference is further made to FIGS. 2B and 2C. FIG. 2B is a schematic illustration of a session request example, in accordance with one aspect of the present invention. FIG. 2C is a schematic illustration of a session request example, in accordance with another aspect of the present invention. With reference to FIG. 2B, the session initialization request to the session manager 102, is produced by the application manager 170 either internally or in sequence with a respective user 174 request therefrom. Alternatively, with reference to FIG. 2C, the session initialization request can be produced by the Out-Of-Band manager 134, in sequence with a respective user request to an application server 180. This is applicable in a case where the application manager 170 is not operative to forward a session initialization request to the session manager 102. In that case, the Out-Of-Band manager 134 detects the aforementioned user request, and directs a respective session initialization to session manager 102, to obtain approval. If approval is granted, then the session manager 102 provides an initiation command to the application server 180 to start producing and providing the application for that approved session.

Session manager 102 determines if the requested session can be approved according to a plurality of parameters such as network policies, target policies, general policies, application manager policies, additional information resources, and the like. it is noted that at this stage the session is not approved yet. The session manager accesses other modules such as the shared area manager 154 and the like, receives their "approval" and only then, approves the session and provides an initiation command to application server 180.

After the session manager 102 approves the session, it accesses the shared area manager 154, which attempts to allocate a suitable channel therefor. If the shared area manager 154 fails to allocate such a channel, then the session manager proceeds to the DNR manager 106. Otherwise, the session manager 102 approves the session.

The DNR manager 106 performs channel and frequency switching (in hardware), and dynamically changes the amount of channels, which are dedicated to each group of nodes, according to the bandwidth usage across groups of nodes. This allocation can be dynamic as long as the total number of dedicated channels, does not exceed the maximum frequency band that is physically achievable within any specific group of nodes. If allocation fails, then the session manager 102 denies the session.

Figure 3:
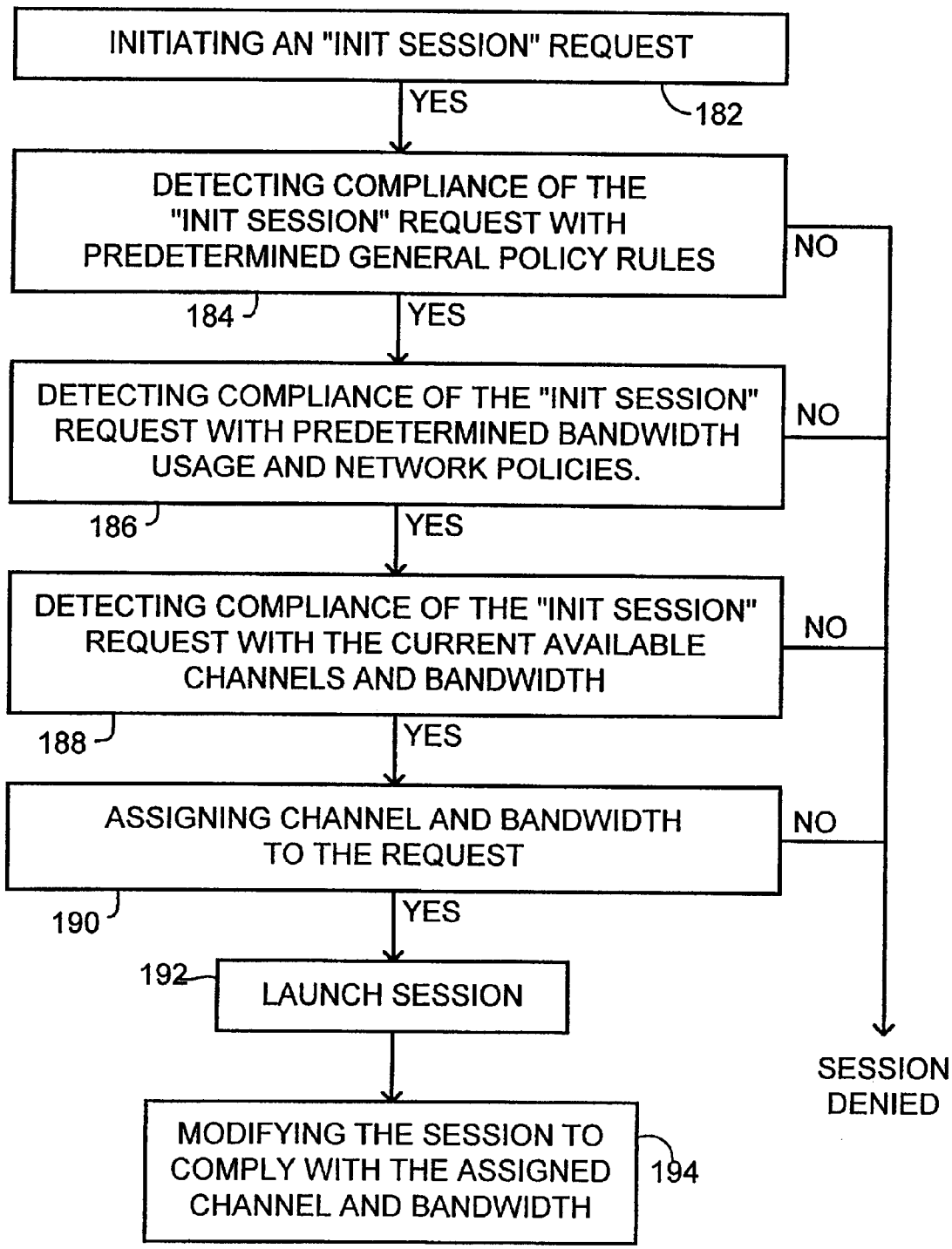
FIG. 3 is an illustration of a method for operating the session management architecture of FIG. 2A of the system of FIG. 1, operative in accordance with a further preferred embodiment of the present invention.

Reference is now made to FIG. 3, which is an illustration of a method for operating session management architecture 150 (FIG. 2A) of system 100 (FIG. 1), operative in accordance with another preferred embodiment of the present invention. In step 182, a session initialization request is initiated. With reference to FIG. 2A, session manager 102 receives an init-session request, as described herein above.

In step 184, compliance of the session initialization request with predetermined general policy rules, is detected. With reference to FIG. 2A, session manager 102 checks compliance of the requested session with policy records of database 156. If such compliance is not detected, then the session is denied.

In step 186, compliance of the session initialization request with predetermined bandwidth usage and network policies, is detected. With reference to FIG. 2A, session manager 102 determines if the requested session can be approved according to a plurality of parameters such as network policies in the network database 160, target policies in target database 158, general policies in the policy database 156, application manager policies in the external application database 162, additional information resources 164, and the like. If such compliance is not detected, then the session is denied.

In step 188, compliance of the session initialization request with the current available channels and bandwidth, is detected. With reference to FIG. 2A, shared area manager 154 checks compliance of the session with channels and bandwidth, which are currently available in the potential path of the session. If such compliance is not detected, then the session is denied. It is noted that step 188 can further include dynamic reallocating of network resources so as to make channels and bandwidth available to the requested session.

In step 190, channel and bandwidth are assigned to the requested session. With reference to FIG. 2A, shared area manager 154 assigns channel and bandwidth to the requested session, which is then launched (step 192). When the available bandwidth is narrower than the one required for the session, and the session can tolerate a reduction in quality, then, such reduction can be imposed (step 194). Launching a session according to step 192 includes programming the selected input module, the switch 274 and the selected output module. It is noted that the bandwidth utilization collector 104 (FIG. 1) can also be updated accordingly.

In further detail, the DNR manager 106 performs channel and frequency switching (in hardware), and dynamically changes the amount of channels which are dedicated to each group of nodes, according to the bandwidth usage across groups of nodes. This allocation can be dynamic as long as the total number of dedicated channels does not exceed the maximum frequency band, that is physically achievable within any specific group of nodes.

Figure 4:
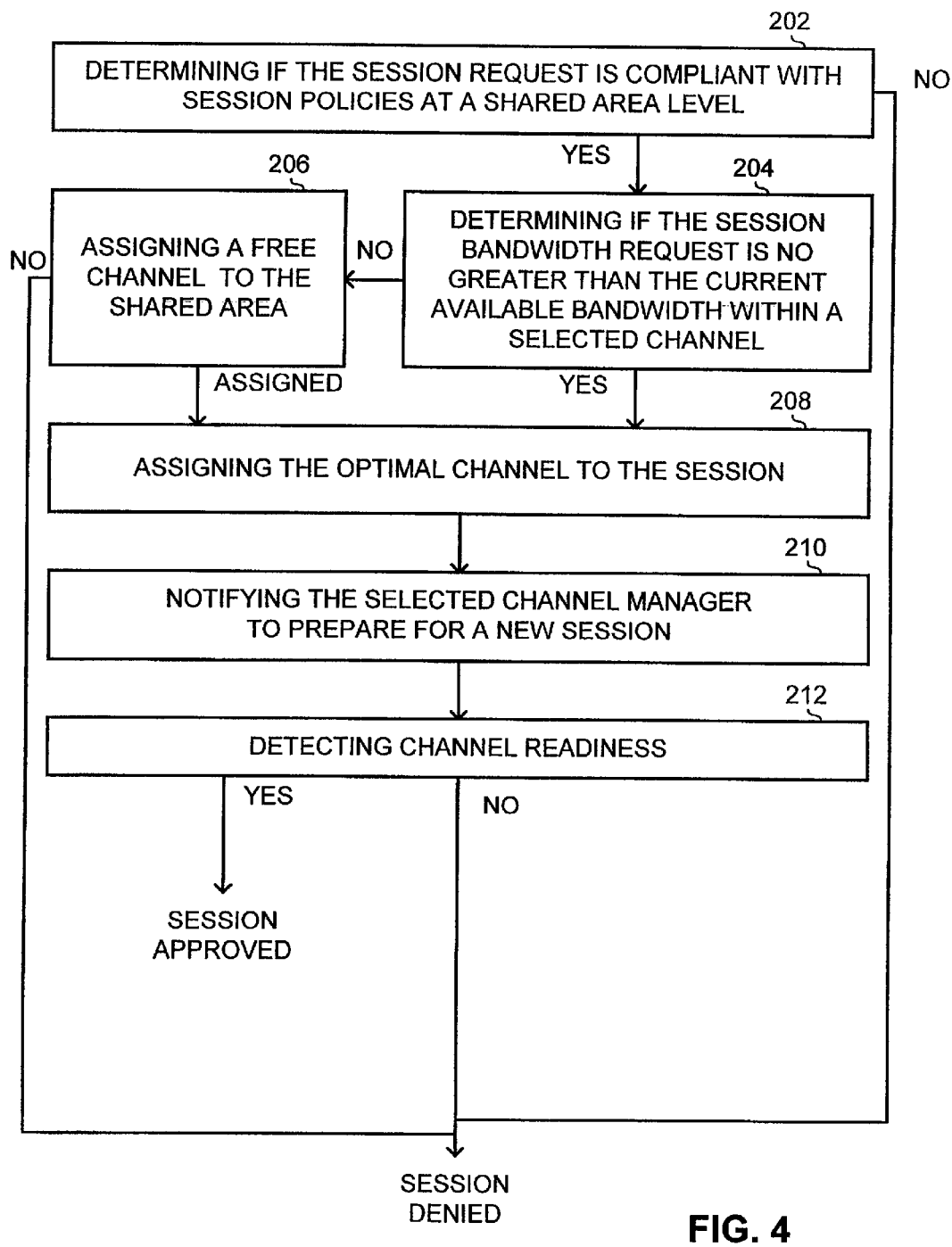
FIG. 4 is an illustration of a method for operating the area manager of FIG. 2A, operative in accordance with another preferred embodiment of the present invention.

Reference is now made to FIG. 4, which is an illustration of a method for operating shared area manager 154 of FIG. 2A, operative in accordance with a further preferred embodiment of the present invention. It is noted that shared area manager 154 is preferably a logical module, which is used to manage a physical shared area, to which a plurality of nodes are connected.

In step 202, compliance of the initialization session request against session policies at a shared area level, is determined. If such compliance is not determined, then the session is denied.

In step 204, the session bandwidth request, respective of the initialization session request, is compared with the current available bandwidth within a selected channel. It is noted that a conventional session can run over one or more channels, where each channel has to be able to provide a predetermined bandwidth. Accordingly, If the session bandwidth request is greater than the current available bandwidth with respect to selected channels, then session request proceed to step 206, else session request proceed to step 208.

In step 206, a free channel is assigned to the current shared area where one is available. This assignment is performed by the DNR 106 as will be described herein below. If such assignment fails, then the session request is denied.

In step 208, an optimal channel is assigned to the session, based on session content type & load balancing network policy. Optimization schemes for managing the load can be determined according to various considerations and can be set by the system operator.

In step 210, the selected channel manager is notified to prepare for a new session. The channel manager adds, by means of multiplexing, this new session to the sessions, which are currently present in that channel. It is noted that this notification can further include session parameters, which are directed at reducing the bandwidth of that session or other selected sessions in the channel.

In step 212, the channel readiness is determined. If the channel is not ready, then the session request is denied. Otherwise, the session request is approved.

Figure 5:
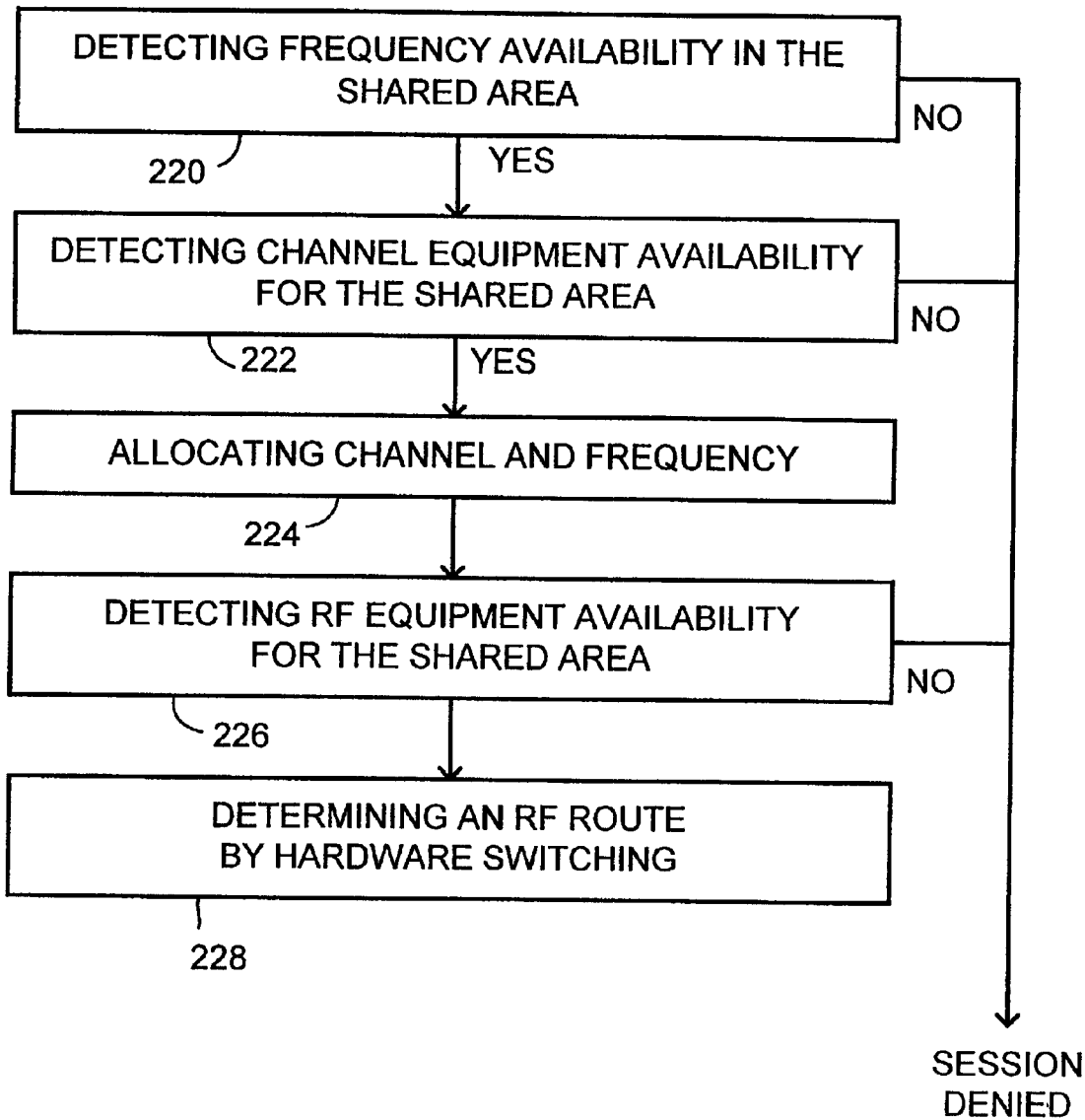
FIG. 5 is an illustration of a method for operating the dynamic network resources manager of FIGS. 1 and 2A, operative in accordance with a further preferred embodiment of the present invention.

Reference is now made to FIG. 5, which is an illustration of a method for operating the DNR manager 106 of FIGS. 1 and 2A, operative in accordance with another preferred embodiment of the present invention. In step 220, bandwidth availability in the shared area, is detected. The bandwidth availability is detected with respect to the frequency bandwidth which is regularly available, and with respect to the currently running application, applications which are scheduled to run during the anticipated time frame of the session request, and other considerations such as bandwidth, which has to be reserved, and the like. If frequency bandwidth is not available, according to the session request, then the session request is denied.

In step 222, availability of channel equipment at the shared area (hardware) is detected. Such channel equipment can include for example an available QAM unit. If such channel equipment is not available, then the session request is denied.

In step 224, channel and frequency are allocated. With reference to FIG. 1, dynamic network restructuring unit 106 operates a selected QAM unit, to modulate the soon to be running session, at a selected frequency bandwidth.

In step 226, RF equipment availability is located for the shared area. Such RF equipment is for example an available input port at a functioning RF combiner. If such RF equipment, which meets the requirements of the session request, is not available, then the session request is denied.

In step 228, an RF route is determined by hardware switching. With reference to FIG. 1, dynamic network restructuring unit 106 operates RF switch 120 to connect a selected QAM of QAM array 118, to a selected input port at a selected RF combiner of RF combiner array 122.

Figure 6:
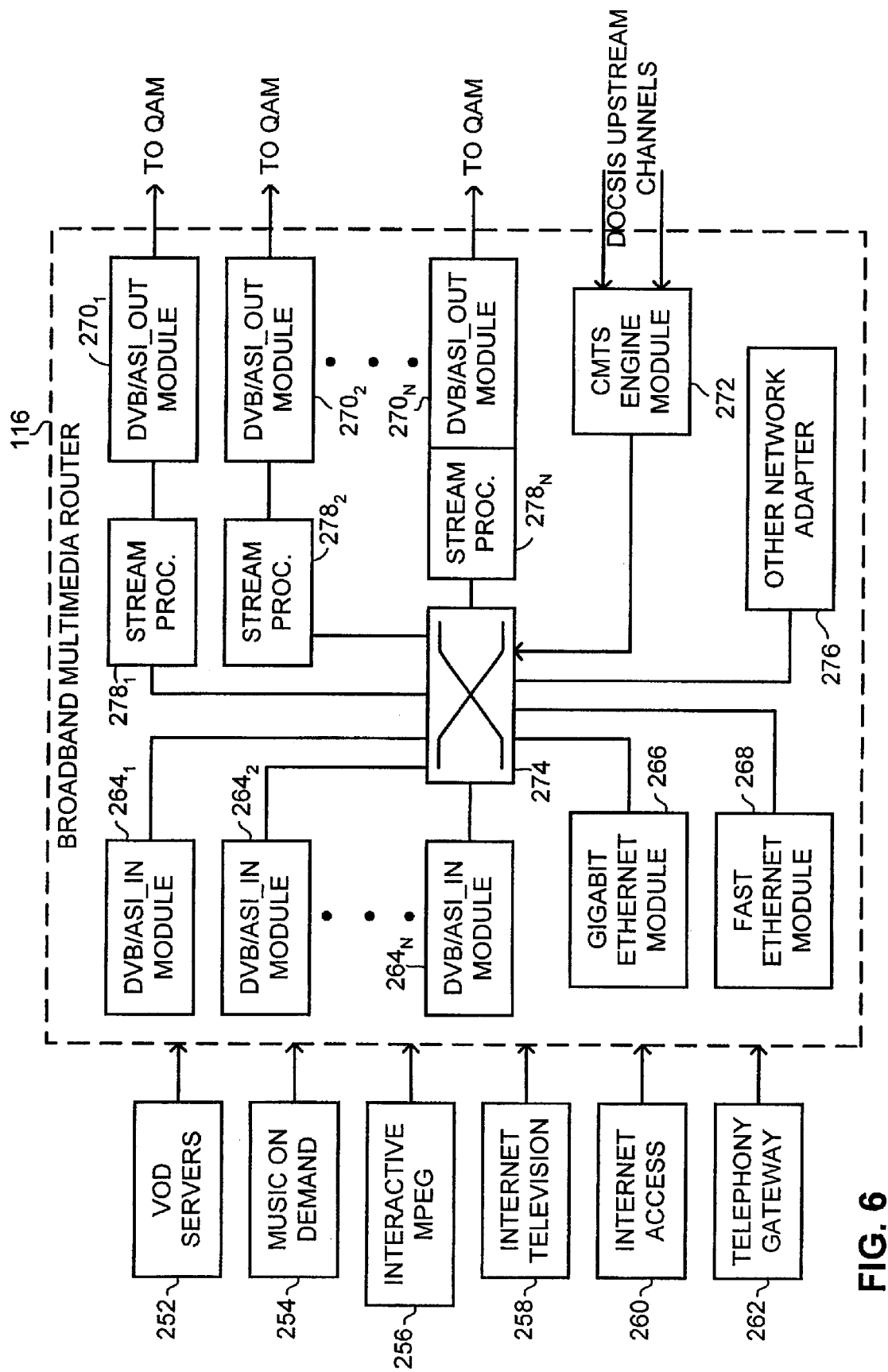
FIG. 6 is a schematic illustration in detail of the router of FIG. 1, constructed and operative in accordance with another preferred embodiment of the present invention.

Reference is now made to FIG. 6, which is a schematic illustration in detail of broadband multimedia router 116 of FIG. 1, constructed and operative in accordance with a further preferred embodiment of the invention. Broadband multimedia router 116 is operative to direct a variety of packet types, even when a packet does not include destination address information. According to the present invention, broadband multimedia router 116 makes sure that each entering data packet, which does not include destination information, is assigned such information, according to the session directing commands provided by the session manager 102.

Broadband multimedia router 116 is fed from a plurality of media sources such as VOD servers 252, music on demand unit 254, interactive MPEG unit 256, Internet television 258, Internet access 260, telephony gateway 262, and the like. Broadband multimedia router 116 includes a plurality of DVB/ASI_IN modules $264_1$, $264_2$ and $264_N$, Gigabit Ethernet module 266, Fast Ethernet module 268, a plurality of DVB/ASI_OUT modules $270_1$, $270_2$ and $270_N$, a plurality of stream processors $278_1$, $278_2$ and $278_N$, a CMTS Engine Module 272, an additional network adapter 276, and a core switch 274. It is noted that broadband multimedia router 116 further includes an internal controller and intermediate memory means (not shown), for operating and coordinating the various units thereof Additional network adapter 276 is operative to connect to various network types such as ATM, SONET, and the like.

Switch 274 is connected to DVB/ASI_IN modules $264_1$, $264_2$ and $264_N$, Gigabit Ethernet module 266, Fast Ethernet module 268, additional network adapter 276 and CMTS Engine Module 272. Switch 274 is further connected to DVB/ASI_OUT modules $270_1$, $270_2$ and $270_N$, via respective stream processors $278_1$, $278_2$ and $278_N$.

DVB/ASI_IN modules $264_1$, $264_2$ and $264_N$ are input ports, which receive MPEG transport packets. It is noted that an MPEG transport packet encapsulating elementary media, includes a stream ID, also called PID. Stream processors $278_1$, $278_2$ and $278_N$ are operative to perform stream processing procedures such as multiplexing, re-multiplexing, rate adaptation, PID re-mapping, PCR re-stamping, updating system information embedded in transport streams, and the like. it is noted that stream processors 278 can be considered an integral part of broadband multimedia router 116.

The following is an example for a complex routing situation, which is performed by broadband multimedia router 116. DVB/ASI_IN module $264_1$ receives three media streams $S_1$, $S_2$ and $S_3$, having PIDs of 50, 100 and 200, respectively. Media streams $S_1$, $S_2$ and $S_3$ are to be directed to DVB/ASI_OUT modules $270_2$, $270_2$ and $270_1$, respectively. Substantially, at the same time, DVB/ASI_IN module $264_2$ receives four media streams $S_4$, $S_5$, $S_6$, and $S_7$, having PIDs of 100, 120, 200 and 300, respectively. Media streams $S_4$, $S_5$, $S_6$, and $S_7$ are to be directed to DVB/ASI_OUT modules $270_2$, $270_7$ (not shown), $270_1$, and $270_{23}$ (not shown), respectively.

In the present example, core switch 274 is a generic packet switching device and hence every packet provided thereto, has to be in a known addressable packet format. With respect to the media streams received at DVB/ASI_IN module $264_1$, broadband multimedia router 116 encapsulates a packet of media stream $S_1$, in an addressable packet, with destination information respective of the switch port, connected to DVB/ASI_OUT module $270_2$ and its original stream PID 50. Switch 274 directs the produced addressable packet to DVB/ASI_OUT module $270_2$, which opens the encapsulation, reconstructs the media stream packet, and assigns the stream PID provided by broadband multimedia router 116. It is noted that broadband multimedia router 116 can provide a stream PID, which is different from the original stream PID of the packet, as will be described herein below.

Broadband multimedia router 116 encapsulates a packet of media stream $S_2$, in an addressable packet, with destination information respective of the switch port connected to DVB/ASI_OUT module $270_2$ and its original PID 100. Broadband multimedia router 116 encapsulates a packet of media stream $S_3$, in an addressable packet, with destination information respective of the switch port connected to DVB/ASI_OUT module $270_1$ and its original PID 200.

With respect to the media streams received at DVB/ASI_IN module $264_2$, broadband multimedia router 116 encapsulates a packet of media stream $S_4$, in an addressable packet, with destination information respective of the switch port connected to DVB/ASI_OUT module $270_2$ but assigns a new PID 150, since PID 100 is already used for DVB/ASI_OUT module $270_2$, by media stream $S_2$. Here, switch 274 directs the produced addressable packet to DVB/ASI_OUT module $270_2$, which opens the encapsulation, reconstructs the media stream packet, and assigns the stream PID (150) provided by broadband multimedia router 116, which is different than the original stream PID (100). Similarly, broadband multimedia router 116 encapsulates a packet of media stream $S_6$, in an addressable packet, with destination information respective of the switch port connected to DVB/ASI_OUT module $270_1$ but with a new PID 100, since PID 200 is already used for DVB/ASI_OUT module $270_1$ by media stream $S_3$. This procedure is called PID re-mapping.

Broadband multimedia router 116 encapsulates a packet of media streams $S_5$ and $S_7$, in addressable packets, with destination information respective of the switch port connected to DVB/ASI_OUT modules $270_7$ and $270_{23}$, with their respective original PIDs 120 and 300.

The above routing procedure is performed according to specific instruction provided by the session manager 102, for example, by means of a routing table. In case of an MPEG transport packet, broadband multimedia router 116 accesses the routing table according to the stream PID of that packet, and the DVB/ASI_IN module identification, which was received, and retrieves the predetermined destination associated therewith. It is noted that the predetermined destination is respective of the combination of the packet stream PID, and the respective DVB/ASI_IN module identification.

A data packet received from Gigabit Ethernet module 266, or from Fast Ethernet module 268, is typically an addressable packet and hence already contains destination information. This data packet can be directed to a respective output port of the switch, according to that destination information. It is noted that session manager 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like. Such stream processing procedures are usually carried in an outgoing route of broadband multimedia router 116 (e.g., either in switch 274, in one of the output modules 270, 276, 266 and 268, or in the route there between, by specific modules). In the present example, each of the DVB/ASI_OUT modules 270 is also operative to encapsulate other types of data in MPEG transport format, perform statistical multiplexing, and stream rate adaptation, to adapt the bandwidth and quality of the media stream to the available network resources.

CMTS Engine Module 272 receives data over MPEG transport from the end user in the up stream direction, transforms it to IP format and provides it to the switch 274, for directing to an IP module such as Gigabit Ethernet module 266, or Fast Ethernet module 268. CMTS Engine Module 272 further transmits DOCSIS downstream information to the end user via DVB/ASI_OUT modules 270.

Figure 7:
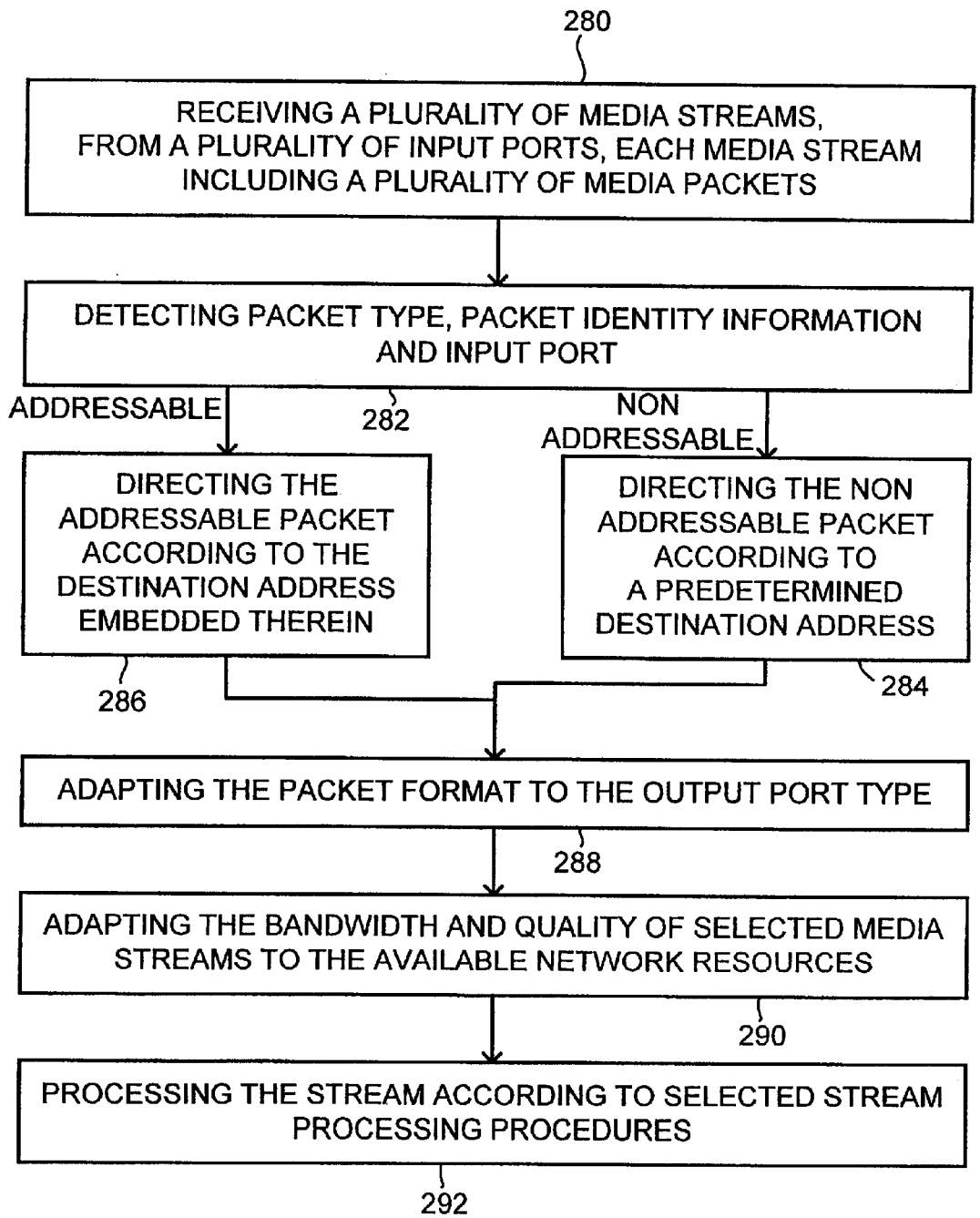
FIG. 7 is an illustration of a method for operating the router of FIG. 6, operative in accordance with a further preferred embodiment of the present invention.

Reference is now made to FIG. 7, which is an illustration of a method for operating broadband multimedia router 116 of FIG. 6, operative in accordance with another preferred embodiment of the present invention. In step 280 a plurality of media streams are received from a plurality of input ports, where each media stream includes a plurality of media packets. These media streams can include video streams, audio streams, data streams and the like. With reference to FIG. 6, DVB/ASI_IN modules $264_1$, $264_2$ and $264_N$, Gigabit Ethernet Module 266, and Fast Ethernet module 268 receive a plurality of media streams from VOD Servers 252, music on demand 254, interactive MPEG 256, Internet television 258, Internet access 260, telephony gateway 262, and the like.

In step 282 the type of a selected packet, its identity and the input port in which it was received, are detected. These media streams are generally divided in two types, which are addressable media streams and non-addressable media streams. An addressable media stream includes specific destination information, which is typically embedded in each of its packets, such as in IP packet, Ethernet packet, and the like. Such destination information is used to direct each packet to the final destination, and do so at different routes for each packet. A non-addressable media stream does not include specific destination information, such as MPEG transport elementary stream, which only includes a packet identification code, indicating that the stream packets belong to the same stream. With reference to FIG. 6, broadband multimedia router 116 determines the packet type, according to the type of input port it was received in. A packet received in a DVB/ASI_IN module 264 is a non-addressable multimedia stream oriented packet (e.g. video, audio or data over multi-media transport standards such as IP over MPEG transport). A packet received in Gigabit Ethernet module 266 or from Fast Ethernet module 268 is an addressable media stream oriented packet, such as an IP packet. The identity and input port information is stored and used in the routing process of each packet. If the packet is non-addressable media stream oriented, then the method proceeds to step 284. Otherwise, if the packet is addressable media stream oriented, then the method proceeds to step 286.

In step 284, a non-addressable packet is directed according to a predetermined destination address. Hence, a non-addressable media stream packet is temporarily converted into an addressable media stream packet, which hence, can be directed. The destination address is provided by the session manager 102 (FIG. 1), and is retrieved momentarily according to the packet stream identification, and according to the identification of the input port, which received it. It is noted that a packet can have more than one destination address. This is known as multicast.

In step 286, an addressable packet is directed according to a destination address embedded therein. It is noted that this address can further be translated to another predetermined destination address provided by the session manager 102 (FIG. 1).

In step 288, the packet format is adapted to conform to the type of the output port. If the routing was performed on data oriented packets, such as IP packets, and the output port type is DVB/ASI, then the packet is converted as follows: a stream oriented packet which was encapsulated in an IP packet format, is reconstructed. A data oriented packet is converted to (encapsulated in) MPEG transport format packets.

In steps 290 and 292, the bandwidth and quality of selected media streams are adapted to meet the available network resources and the stream is processed according to selected stream processing procedures, such as multiplexing, re-multiplexing, rate adaptation, PID re-mapping, PCR re-stamping, updating system information embedded in transport streams, and the like. With reference to FIG. 6, these operations are performed by DVB/ASI_OUT modules 270 and stream processors 278.

This technique of enabling non addressable media stream switching (such as MPEG) provides several advantages such the enhanced sharing of bandwidth among several sessions, the mere mixing of addressable media streams with non addressable media streams, enhanced hardware and bandwidth utilization and more.

Figure 8:
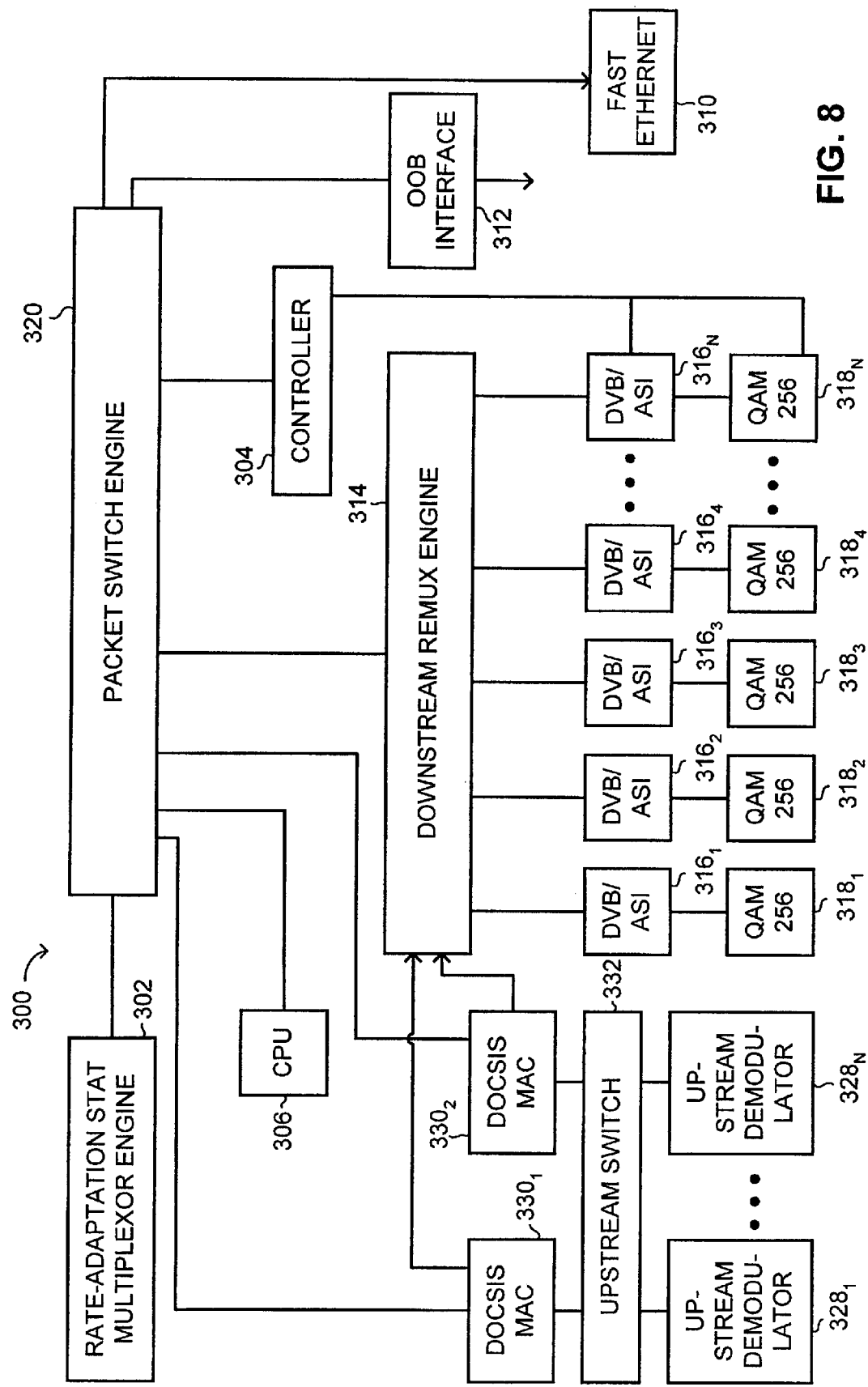
FIG. 8 is a schematic illustration of a packet switch system, constructed and operative in accordance with another preferred embodiment of the present invention.

Reference is now made to FIG. 8, which is a schematic illustration of a packet switch system, generally referenced 300, constructed and operative in accordance with a further preferred embodiment of the invention. System 300 includes a packet switch engine 320, a rate-adaptation statistical-multiplexor engine 302, a controller 304, a CPU 306, Fast Ethernet interface 310 and an out-of-band interface 312 to the out-of-band manager (not shown), a downstream re-multiplexor engine 314, and a plurality of DVB/ASI modules $316_1$, $316_2$, $316_3$, $316_4$ and $316_N$. System 300 further includes a plurality of QAM units $318_1$, $318_2$, $318_3$, $318_4$ and $318_N$, two DOCSIS MAC units $330_1$, and $330_2$, an upstream switch 332, and a plurality of upstream demodulators $328_1$ and $328_N$.

Packet switch engine 320 is connected to rate-adaptation statistical-multiplexor engine 302, controller 304, downstream re-multiplexor engine 314, Fast Ethernet interface 310, out-of-band interface 312, CPU 306 and DOCSIS MAC units $330_1$ and $330_2$. Downstream re-multiplexor engine 314 is further connected to DVB/ASI modules $316_1$, $316_2$, $316_3$, $316_4$ and $316_N$. Each DVB/ASI module 316 is further connected to a respective QAM unit $318_1$, $318_2$, $318_3$, $318_4$ and $318_N$. Upstream switch 332 is connected between upstream demodulators $328_1$ and $328_N$, and DOCSIS MAC units $330_1$ and $330_2$. Each output channel directed through a selected DVB/ASI module, is operative to transmit a plurality of video sessions, as well as a plurality of DOCSIS sessions, at the same time.

Each of the upstream demodulators $328_1$ and $328_N$ performs down-conversion, and demodulation to upstream channels received from an end user. The upstream switch 332 receives a plurality of upstream channels from upstream demodulators $328_1$ and $328_N$, each carrying DOCSIS return path information. The upstream switch 332 is operative to direct each of the received upstream channels, to each of the DOCSIS MAC units $330_1$ and $330_2$, thereby providing improved bandwidth efficiency, and better redundancy and reliability for the upstream functionality. This architecture allows the upstream resources to be dynamically allocated to each of DOCSIS MAC units $330_1$ and $330_2$. When noise or other errors appear on a specific upstream channel, switch 332 can dynamically change the upstream channel allocation.

DOCSIS MAC units $330_1$ and $330_2$ provide packets received from upstream switch 332, either to downstream re-multiplexing engine 314 or to packet switch engine 320, depending on the packet content type and original destination. Downstream re-multiplexor engine 314 performs data encapsulation, statistical multiplexing and video rate adaptation and multiplexing.

System 300 can further perform load balancing of outgoing transmission of various types, at the same time and through the same outgoing channels, such as a plurality of video streams and a plurality of DOCSIS sessions, transmitted over the same DVB/ASI modules 316. CPU 306 determines and controls the load balancing between such competing elements and provides parameters there according, to downstream re-multiplexing engine 314, rate adaptation statistical multiplexor engine 302 and DOCSIS MAC units $330_1$ and $330_2$.

For example, a video stream and a DOCSIS session, which are transmitted over one of the DVB/ASI modules 316 initially separated to various quality levels (described herein below in conjunction with FIGS. 10A–10K), where the first quality level denotes a minimal quality which has to be provided at all times. Higher quality levels can be provided when sufficient bandwidth is available therefor. It is therefor noted that the first quality level has the highest transmit priority.

DOCSIS sessions can be categorized according to quality of service associated therewith or assigned thereto. For example, an Email session would normally be characterized by a low level of quality of service and telephony sessions would normally be characterized by a high level of quality of service. CPU 306 constantly detects the load status of the system 300 and dynamically assigns transmit priority to the DOCSIS sessions processed by DOCSIS MAC units $330_1$ and $330_2$. Hence, when system 300 is significantly loaded by video sessions, some non real time sessions such as DOCSIS Email sessions can be delayed or assigned narrower bandwidth, while real time sessions, such as telephony sessions are forced into the transmit route, even at the expense of further degrading the quality of currently transmitting video sessions towards their first quality level.

Packet switch engine 320 receives different types of information via different input modules, such as Fast Ethernet interface 310 (coupled to the Internet or to similar networks), or out-of-band interface 312. Packet switch engine 320 analyzes the nature of the received streams simultaneously, and directs them according to a decision scheme illustrated herein below in conjunction with FIG. 9. Controller 304 controls the operation of the packet switch engine 320.

The rate-adaptation statistical-multiplexor engine 302, performs statistical multiplexing as well as rate adaptation when required, to elementary streams, before they are directed by the switch 320. CPU 306 is the central processing unit of the system, and can be supported in a cluster by other CPUs for increased system redundancy.

Figure 9:
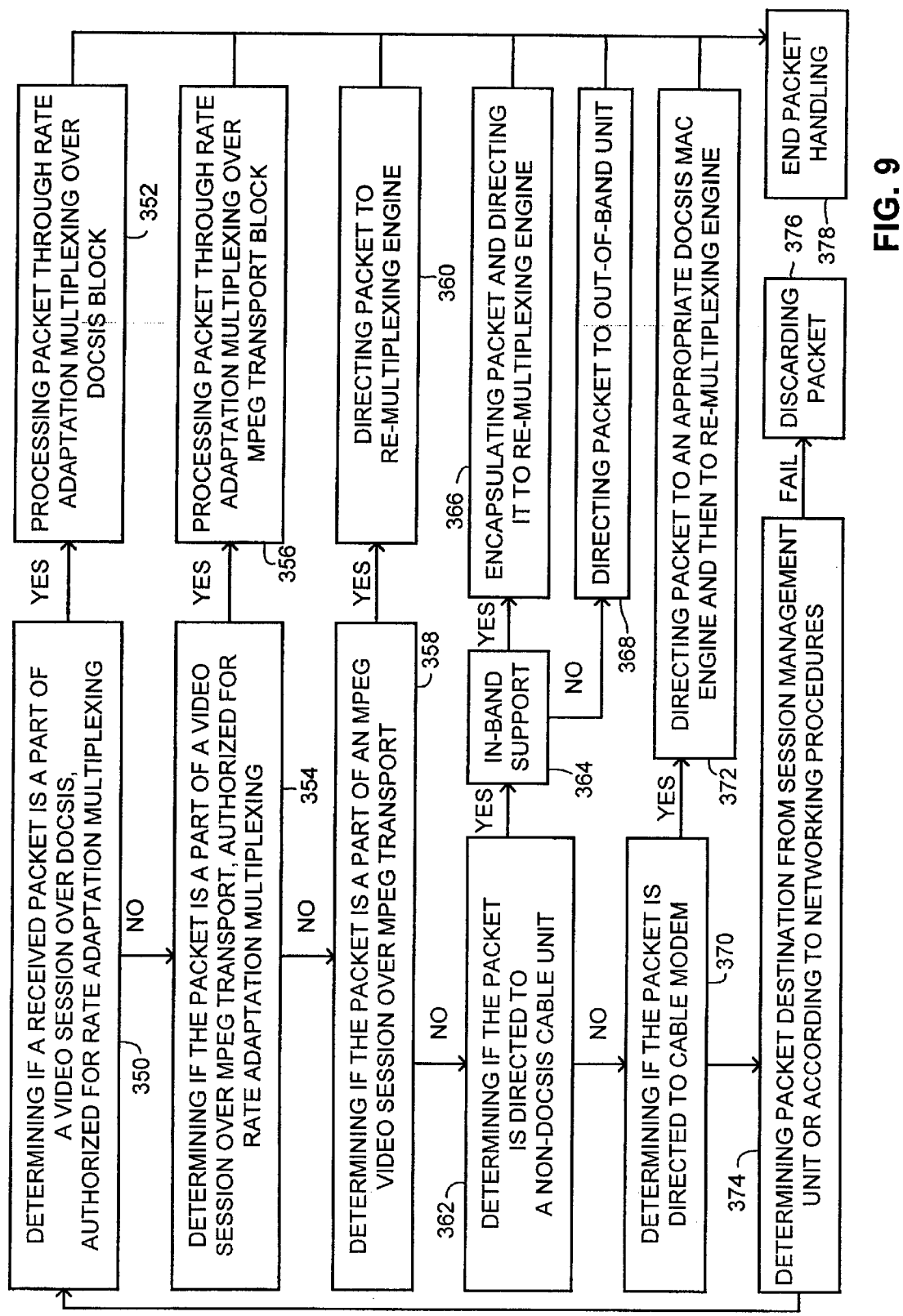
FIG. 9 is a schematic illustration of a method for operating the system of FIG. 8, operative in accordance with a further preferred embodiment of the present invention.

Reference is now made to FIG. 9, which is a schematic illustration of a method for operating system 300 of FIG. 8, operative in accordance with another preferred embodiment of the present invention.

In step 350, a received packet is analyzed to determine if it is a part of a video session over IP over DOCSIS, authorized for rate adaptation multiplexing. If so, then the packet is rate adapted (when required) and multiplexed over a DOCSIS block (step 352). With reference to FIG. 8, the packet is directed to module 302, where such operations are performed, and then further directed to DOCSIS MAC units 330 for further direction to the downstream re-multiplexing engine 314. Otherwise, the method proceeds from step 354.

In step 354, the received packet is further analyzed to determine if it is a part of a video session over MPEG transport, authorized for rate adaptation multiplexing. If so, then the packet is rate adapted (when required) and multiplexed over an MPEG transport block (step 356). With reference to FIG. 8, the packet is directed to module 302, where such operations are performed and further directed to downstream re-multiplexing engine 314. Otherwise, the method proceeds from step 358.

In step 358, the received packet is further analyzed to determine if it is a part of an MPEG video session over MPEG transport. If so, then the packet is directed to the cable system (step 360). With reference to FIG. 8, the packet is directed to downstream re-multiplexing engine 314. Otherwise, the method proceeds from step 362.

In step 362, the received packet is further analyzed to determine if its destination is a non-DOCSIS cable unit (for example an IP packet). If so, and the destination non-DOCSIS cable unit includes In-Band support for IP data (step 364), then the packet is encapsulated and re-multiplexed (step 366), before it is sent to that destination non-DOCSIS cable unit. But if the destination non-DOCSIS cable unit does not include In-Band support (step 364), then the packet is directed to the Out-Of-Band unit (step 368).

With reference to FIG. 8, since the packet is not a video packet, it is either encapsulated in MPEG transport and sent to the cable network via re-multiplexing engine 314, (step 366) when the receiving non-DOCSIS cable unit includes In-Band support, or sent through the Out-Of-Band via out-of-band interface 312 (step 368).

In step 370, the received packet is further analyzed to determine if its destination is a cable modem. If so then the packet is directed to the cable network via DOCSIS MAC with re-multiplexing. With reference to FIG. 8, the packet is directed to appropriate DOCSIS MAC engine 330, and then directed to the cable network via re-multiplexing engine 314.

In step 374, a final attempt is performed to classify the packet and determine its destination. If this attempt fails then the packet is discarded (step 376). With reference to FIG. 8, after the packet could not be classified, as described above, the session manager 102 is accessed to attempt to determine the packet destination. Further query procedures via conventional networking can also be performed at this time, for the same purpose. If the attempt to determine the destination of the packet fails, then the packet is discarded (step 376). Otherwise, the packet is directed to its destination and the method repeats from step 350 for the next packet.

It is noted that at the end of steps 352, 356, 360, 366, 368 and 370, the packet is substantially transmitted out of the routing system, and hence need not be handled anymore, thereby (step 378).

Control of the quality of video streams can be performed in many ways. Listed herein below is a novel method provided with respect to MPEG ISO/IEC 11172 and ISO/IEC 13818 video compression standards. A picture, which is to be encoded includes either a complete frame, or a field, which is the even or odd lines of a. complete frame. The above standards define three types of encoded pictures, an I-picture, a B-picture and a P-picture. An I-picture (Intra-picture) includes the entire information, which is required to reconstruct the encoded picture. A P-picture (Predictive) includes information, which, in combination with previously encoded P-pictures and I-pictures, can reconstruct the encoded picture. A B-picture (Bi-directional) includes information, which, in combination with previous and future I-pictures and P-pictures, can reconstruct the encoded picture.

A picture to be encoded is divided into components at different levels. A slice includes a predetermined number of lines. A block includes a matrix of 8×8 pixels. A macro-block includes a 2×2 matrix of luminance blocks (which results in a 16×16 matrix of pixels).

Each block of pixels is transformed using Discrete Cosine Transform (DCT) which produces a respective sequence of values. These values are then divided by a quantizing parameter, also called the quantizing scale and only the integer portion of the results, is kept. For example, if the DCT results in the following sequence 16, 5, 10, 2, 0, 4 and the quantizing scale is 6, then the resulting sequence is 2, 0, 1, 0, 0, 0. It is noted that a different quantizing value can be used for every macro-block.

After the DCT and quantizing stages, the set of values, preferably includes a large number of zero values. The values are further encoded using a method called Run Level Encoding (RLE), which transforms the sequence into pairs of number, a value (greater than zero) and the number of zero values that preceded it.

The present invention provides a method in which a quantized sequence is further quantized to a plurality of higher quantization levels (higher compression, lower quality). The highest quantization level is set to be the base level. The output data includes the base level and the difference between each two adjacent levels, up to the original one.

The following description addresses a stream component, which is a single frame. It is noted, for the purpose of the present invention, that frame can be replaced by any other stream component such as a slice, a macro-block, a block, a field and the like.

Figure 10B:
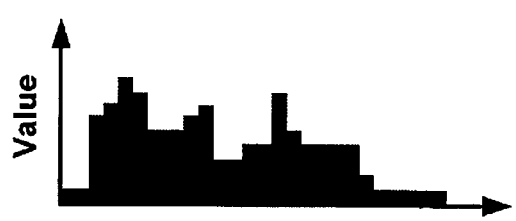
FIGS. 10B 10C, 10D, 10E and 10F are visual representations of the block of FIG. 10A, at different quantizing values, in accordance with a preferred embodiment of the present invention.
Figure 10B:

Reference is now made to FIG. 10A, which is a visual representation of block DCT values, at a predetermined quantizing value, after basic quantizing. As seen in FIG. 10A, most of the values are greater than zero. Reference is now made to FIGS. 10B, 10C, 10D, 10E and 10F, which are visual representations of the block of FIG. 10A, at different quantizing values, in accordance with a preferred embodiment of the present invention. FIGS. 10B, 10C, 10D, 10E and 10F represent the block values at respective quantizing values of Q=5, 4, 3, 2 and 10A (e.g., FIG. 10B represents the integer portions of the results of a division of the values of FIG. 10F, by 5.

Figure 10G:
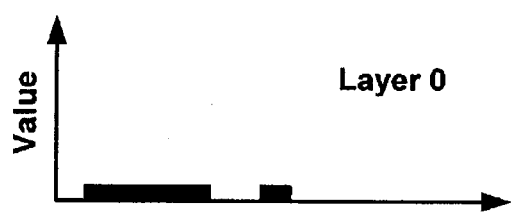
FIGS. 10G, 10H, 10I, 10J and 10K are representation of a layer structure, in accordance with another preferred embodiment of the present invention.
Figure 10C:
Figure 10H:
Figure 10D:
Figure 10I:
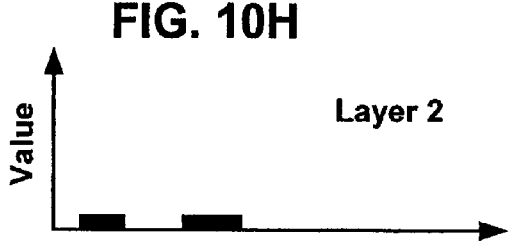
Figure 10E:
Figure 10J:
Figure 10F:
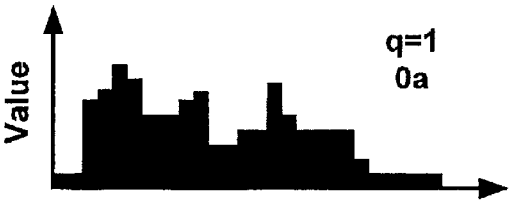
Figure 10K:

Reference is now made to FIGS. 10G, 10H, 10I, 10J and 10K, which are representation of a layer structure, in accordance with another preferred embodiment of the present invention. FIG. 10G is a visual representation of the block of FIG. 10A, at the highest quantizing value and is identical to FIG. 10B. FIG. 10H represents the difference (Δ) between the representations of FIGS. 10B and 10C, so that adding the representation of FIG. 10C over the one of FIG. 10G, yields in the representation of FIG. 10C. similarly, FIG. 10I represents the difference (Δ) between the representations of FIGS. 10C and 10D, FIG. 10J represents the difference (Δ) between the representations of FIGS. 10D and 10E and FIG. 10K represents the difference (Δ) between the representations of FIGS. 10E and 10F.

The newly compressed frames at each of the compression levels (FIGS. 10B, 10C, 10D, 10E and 10F) can now be used to reproduce a representation of the media stream (deteriorated according to the compression level) or be sent to a far end of a communication network. Alternatively, the base layer (FIG. 10G) and as many successive supplemental layers (FIGS. 10H, 10I, 10J and 10K), can now be used to reproduce the media stream at various quality levels or be sent to a far end of a communication network. It is noted that a further packetizing stage can be used for re-multiplexing of a plurality of media streams.

It will be appreciated by persons skilled in the art that the present invention is not limited to what has been particularly shown and described hereinabove. Rather the scope of the present invention is defined only by the claims, which follow.

What is claimed is:

1. System for switching packets comprising:
   a plurality of input ports, including at least one non-addressable stream input port;
   a plurality of non-addressable stream output ports;
   a multiple port switch, connected between said non-addressable stream input ports and said non-addressable stream output ports;
   said multiple port switch directing a packet received from a selected one of said at least one non-addressable stream input ports, to at least one of said at least one non-addressable stream output ports,
   said multiple port switch selecting said selected non-addressable stream output port according to the type of said selected non-addressable stream input port and the packet identity information embedded in said received packet.

2. The system according to claim 1, further comprising a priority controller, connected to said multiple port switch.

3. The system according to claim 1, further comprising at least one media degradation unit, each said at least one media degradation unit coupled to a selected one of said non-addressable stream output ports.

4. The system according to claim 1, wherein said at least one non-addressable stream input port is operative to receive MPEG transport packets.

5. The system according to claim 4, wherein said MPEG transport packets are encapsulated into communication packets respective of the communication protocol of said multiple port switch.

6. The system according to claim 1, further comprising at least one addressable stream communication port, connected to said multiple port switch,
said multiple port switch directing a packet, received from a selected one of said at least one addressable stream communication ports, to at least a selected one of said at least one non-addressable stream output ports.

7. The system according to claim 1, wherein said at least one addressable stream input port is operative to receive Ethernet packets or IP packets.

8. The system according to claim 1, wherein said selected non-addressable stream output port encapsulating said packet in a non-addressable stream packet, when said packet is received from one of said at least one addressable stream input ports.

9. The system according to claim 1, wherein said multiple port switch is an Ethernet switch.

10. The system according to claim 1, wherein said multiple port switch is a communication switch.

11. The system according to claim 1, wherein said at least one non-addressable stream input port comprises a multiple program transport interface and wherein said at least one non-addressable stream output port comprises a multiple program transport interface.

12. The system according to claim 1, wherein said at least one addressable stream input port comprises a data input port.

13. The system according to claim 1, further comprising a plurality of stream processors, each said stream processor being connected between said multiple port switch and a respective one of said non-addressable stream output ports.

14. The system according to claim 13, wherein each said stream processors is operative to at least perform a procedure selected from the list consisting of:
multiplexing;
re-multiplexing;
rate adaptation;
PID re-mapping;
PCR re-stamping; and
updating system information embedded in transport streams.

15. Method for switching packets, the method comprising the steps of:
receiving a packet from an input port selected from at least one non-addressable stream input port;
selecting at least one of a plurality of non-addressable stream output ports according to the type of said selected input port and the packet identity information embedded in said received packet;
and directing said packet to said selected non-addressable stream output port.

16. The method according to claim 15, wherein said input port is further selected from at least one addressable stream input port.

17. The method according to claim 16, further comprising the step of encapsulating said packet in a non-addressable stream packet, when said packet is received from one of said at least one addressable stream input ports.

18. The method according to claim 16, wherein said addressable stream packet includes a data packet.

19. The method according to claim 15, further comprising the step of prioritizing the directing of the session associate with said received packet.

20. The method according to claim 15, further comprising the step of encapsulating said packet in a addressable stream packet, when said packet is received from one of said at least one non-addressable stream input ports.

21. The method according to claim 15, wherein said non-addressable stream packet includes an MPEG transport packet.

22. The method according to claim 15, further comprising the step of stream processing said packet.

23. The method according to claim 22, wherein said step of stream processing said packet includes at least a procedure selected from the list consisting of:
multiplexing;
re-multiplexing;
rate adaptation;
PID re-mapping;
PCR re-stamping; and
updating system information embedded in transport streams.

24. Method for switching packets, the method comprising the steps of:
receiving a packet from an input port selected from at least one non-addressable stream input port;
when said packet is received from said at least one non-addressable stream input port, detecting input port type information and packet identity information associated with said received packet, determining at least one destination port according to said input port type information and packet identity information and embedding said packet in an addressable stream packet with a header directed to at least a selected one of said at least one destination port; and directing said data packet to said destination port.

25. The method according to claim 24, wherein said input port is further selected from at least one addressable stream input port, the method further comprising the step of determining said received packet a data packet having at least one destination port when said packet is received from said at least one addressable stream input port, before said step of directing.

26. The method according to claim 25, wherein said addressable stream packet includes a data packet.

27. The method according to claim 24, wherein said identity information includes the identity of said at least one non-addressable stream port receiving said packet.

28. The method according to claim 27, wherein said identity information further includes the identity of a media stream associated with said packet.

29. The method according to claim 24, wherein said identity information includes the identity of a media stream associated with said packet.

30. The method according to claim 24, further comprising the step of stream processing said packet.

31. The method according to claim 30, wherein said step of stream processing said packet includes at least a procedure selected from the list consisting of:
multiplexing;
re-multiplexing;
rate adaptation;
PID re-mapping;
PCR re-stamping; and
updating system information embedded in transport streams.

32. The method according to claim 24, wherein said non-addressable stream packet includes an MPEG transport packet.

* * * * *